(12) United States Patent
Auriffeille et al.

(10) Patent No.: US 8,892,037 B2
(45) Date of Patent: Nov. 18, 2014

(54) METHODS AND SYSTEMS FOR COMMUNITY-WIDE INFORMATION EXCHANGE VIA INDIVIDUAL COMMUNICATIONS TERMINALS

(75) Inventors: Jean-François Auriffeille, La Grande-Motte (FR); Pierre Richard, Montpellier (FR); Charles-Edouard Ruault, Paris (FR)

(73) Assignee: Maeglin Software, Montpellier (FR)

( * ) Notice: Subject to any disclaimer, the term of this patent is extended or adjusted under 35 U.S.C. 154(b) by 1534 days.

(21) Appl. No.: 12/514,433

(22) PCT Filed: Nov. 12, 2007
(Under 37 CFR 1.47)

(86) PCT No.: PCT/EP2007/062209
§ 371 (c)(1),
(2), (4) Date: Jan. 3, 2011

(87) PCT Pub. No.: WO2008/056000
PCT Pub. Date: May 15, 2008

(65) Prior Publication Data
US 2012/0040615 A1    Feb. 16, 2012

Related U.S. Application Data

(60) Provisional application No. 60/857,873, filed on Nov. 10, 2006, provisional application No. 60/998,364, filed on Oct. 9, 2007, provisional application No. 60/998,312, filed on Oct. 9, 2007.

(51) Int. Cl.
*H04B 7/00*    (2006.01)
(Continued)

(52) U.S. Cl.
CPC ............... *G06Q 30/02* (2013.01); *H04W 8/205* (2013.01); *H04L 12/581* (2013.01);
(Continued)

(58) Field of Classification Search
CPC . H04L 63/0428; H04L 63/0823; H04L 63/10; H04L 65/1069; H04L 67/02; H04L 67/18; H04L 67/22; H04L 67/26; H04L 67/303; H04L 67/42
USPC .................. 379/221.01, 221.14, 221.15, 219; 340/10.1; 455/41.2, 41.1
See application file for complete search history.

(56) References Cited

U.S. PATENT DOCUMENTS

2002/0090911 A1    7/2002    Evans et al.
2002/0165919 A1    11/2002    Pietila
(Continued)

FOREIGN PATENT DOCUMENTS

WO    WO 01/72063 A1    9/2001
WO    WO 03/090415 A2    10/2003
WO    WO 2005/125026 A2    12/2005

*Primary Examiner* — Ping Hsieh
*Assistant Examiner* — Xin Jia
(74) *Attorney, Agent, or Firm* — Blakely Sokoloff Taylor & Zafman

(57) ABSTRACT

A method for detecting matching profiles in an environment of wireless terminals each having a short range communications capability, comprises the steps of: —generating profiles respectively belonging to a plurality of users, —storing said profiles in wireless terminals associated with said user, —when a pair of terminals become in range with each other, automatically establishing a short range bidirectional communications channel therebetween, —through this channel, transmitting the profiles stored in each terminal to the other terminal, performing a matching test between said received profiles and other profiles previously stored in the terminal, and—when a matching between profiles is determined by a terminal, providing profile matching information so that the users to which said profiles belong can be put in connection with each other. The present invention also provides other related communication methods, as well as a terminal and a system for implementing the methods.

24 Claims, 9 Drawing Sheets

(51) Int. Cl.
  *H04B 5/00*  (2006.01)
  *H04W 8/20*  (2009.01)
  *H04L 12/58*  (2006.01)
  *G06Q 10/10*  (2012.01)
  *G06Q 30/02*  (2012.01)
  *H04L 29/08*  (2006.01)
  *H04W 8/24*  (2009.01)
(52) U.S. Cl.
  CPC ............... *H04L 51/04* (2013.01); *H04L 67/14* (2013.01); *G06Q 10/10* (2013.01); *H04L 67/306* (2013.01); *H04W 8/24* (2013.01); *H04L 12/5895* (2013.01); *H04L 51/38* (2013.01)
  USPC ........................................ 455/41.2; 455/41.1

(56) References Cited

U.S. PATENT DOCUMENTS

| | | | |
|---|---|---|---|
| 2004/0162056 A1* | 8/2004 | Engelhart | 455/411 |
| 2005/0281237 A1* | 12/2005 | Heinonen et al. | 370/338 |
| 2006/0161599 A1* | 7/2006 | Rosen | 707/201 |
| 2008/0123683 A1* | 5/2008 | Cheng et al. | 370/464 |

* cited by examiner

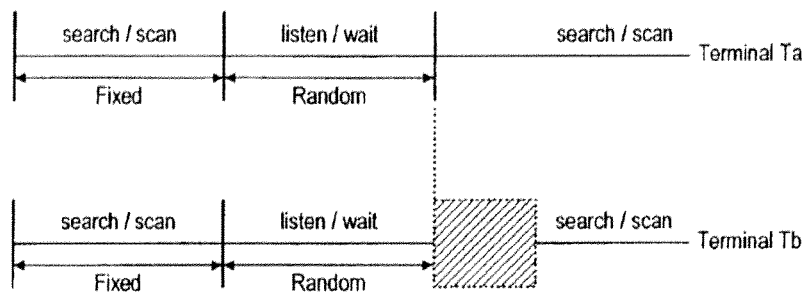

FIG. 5A

```xml
<profileType id="111111" version="1" name="Affaires">
    <attributes>
        <attribute id="1" label="Pseudo" type="Text" required="true" useForMatch="false"/>
        <attribute id="2" label="numéro mobile" type="Communs" required="false" useForMatch="false"/>
        <attribute id="3" label="email" type="Communs" required="false" useForMatch="false"/>
        <attribute id="4" label="blog/site" type="Communs" required="false" useForMatch="false"/>
        <attribute id="5" label="Nom société" type="Text" required="true" useForMatch="true" matchWeight="20" mandatory="false" />
        <attribute id="6" label="Activité" type="DropDown" required="true" useForMatch="true" matchWeight="20" mandatory="false">
            <choices>
                <choice label="Admin publique" id="1"/>
                <choice label="Agriculture, pêche" id="2"/>
                <choice label="Association" id="3"/>
                <choice label="Assurance" id="4"/>
                <choice label="Automobile" id="5"/>
                <choice label="Banque et finance" id="6"/>
                <choice label="Commerce détail et gros" id="7"/>
                <choice label="Conseil" id="8"/>
                <choice label="Construction" id="9"/>
                <choice label="Droit" id="10"/>
                <choice label="Edition, presse, media" id="11"/>
                <choice label="Education, formation" id="12"/>
                <choice label="Electricité, gaz, eau, déchets" id="13"/>
                <choice label="Fabr. machines et équipements" id="14"/>
                <choice label="Hôtels et restaurants" id="15"/>
                <choice label="Immobilier" id="16"/>
                <choice label="Industrie alimentaire" id="17"/>
                <choice label="Industrie chimique et papier" id="18"/>
                <choice label="Industrie textile et habillement" id="19"/>
                <choice label="Industries extract. et métallurgie" id="20"/>
                <choice label="Informatique et NTIC" id="21"/>
                <choice label="Pub, marketing, RP" id="22"/>
                <choice label="Raffinage et nucléaire" id="23"/>
                <choice label="Santé et social" id="24"/>
                <choice label="Services à la personne" id="25"/>
                <choice label="Services aux entreprises" id="26"/>
                <choice label="Sports, loisirs, arts" id="27"/>
                <choice label="Télécom" id="28"/>
                <choice label="Transports et Logistique" id="29"/>
            </choices>
        </attribute>
```

FIG. 5B

```xml
<attribute id="7" label="Pays" type="DropDown" required="true" useForMatch="true" matchWeight="20" mandatory="false">
    <choices>
        <choice label="France" id="30"/>
        <choice label="USA" id="31"/>
        <choice label="Allemagne" id="32"/>
        <choice label="Italie" id="33"/>
        <choice label="Espagne" id="34"/>
        <choice label="GB" id="35"/>
    </choices>
</attribute>
<attribute id="8" label="Je cherche" type="DropDown" required="true" useForMatch="true" matchWeight="20" mandatory="false">
    <choices>
        <choice label="Clients" id="36">
            <matchWith id="37"/>
            <matchWith id="38"/>
        </choice>
        <choice label="Distributeurs" id="37">
            <matchWith id="36"/>
        </choice>
        <choice label="Fournisseurs" id="38">
            <matchWith id="36"/>
        </choice>
        <choice label="Investir/Acheter" id="39">
            <matchWith id="40"/>
            <matchWith id="41"/>
        </choice>
        <choice label="Vendre société" id="40">
            <matchWith id="39"/>
        </choice>
        <choice label="financement" id="41">
            <matchWith id="39"/>
        </choice>
    </choices>
</attribute>
</attributes>
</profileType>
```

FIG. 6

| Name | Type | Description |
|---|---|---|
| profilesCount | Byte | Number of profiles stored in the binary file |
| profileId | 6 Bytes | 3 bytes for the partner ID and<br>3 bytes for the profile ID at the partner |
| version | 2 Bytes | Profile version (1 MSB byte, 1 LSB byte) |
| profileNameSize | Byte | Number of characters of profile name |
| profileName | String | Profile name |
| attrCount | Byte | Number of attributes in profile |
| attrProperties | Byte | Attribute properties, bit mask |
| attrItemCount | Byte | Number of values of the attribute<br>(present only for 'drop down/multiple choice' types) |
| AttrItemLabelSize | Byte | Number of characters of attribute label |
| attrItemLabel | String | Attribute label for display |
| attrItemId | Byte | Attribute ID |
| attrItemNameSize | Byte | Byte Number of characters of attribute name<br>(present only for 'drop down/multiple choice' types) |
| attrItemName | String | Attribute name |
| matchWeight | Byte | Weight of the attribute for the profile match<br>(present only if the attribute is used for profile matching) |
| matchWithCount | Byte | Number of 'matchWith' attributes |
| matchWith | Byte | Id of the attribute with which the considered<br>attribute has to be compared |

FIG. 7

| Name | Type | Description |
| --- | --- | --- |
| profileId | 6 Bytes | 3 bytes for the partner ID and<br>3 bytes for the profile ID at the partner |
| ownerId | 4 Bytes | PleexID of the owner |
| ProfileNumber | 2 Bytes | Number of the user profile in the category |
| ProfileVersion | 2 Bytes | Profile revision (incremented at each change) |
| profileOptions | 1 Byte | Bit table describing the profile options (e.g. public/private) |
| TemplateVersion | 2 Bytes | Version of the profile model (1 MSB Byte, 1 LSB Byte) |
| attrCount | 1 Byte | Number of attributes |
| attrID | 1 Byte | Attribute ID |
| attrItemCount | 1 Byte | Number of items. Present if multiple choice.<br>Condition: attrID should be a multiple choice |
| attrItemId | 1 Byte | Item ID. Present if single choice or multiple choice and if Item other than text field.<br>Condition: attrID should not be a free text field |
| attrValueSize | 1 Byte | Size of the text to be displayed<br>Condition: attrID should be a free text field |
| attrValue | String | Text to be displayed<br>Condition: attrID should be a free text field |

| Type | Size | Comments |
| --- | --- | --- |
| Version | 1 Byte | Allows to manage evolutions |
| Number of advertisement messages | 1 Byte | Number of banners included in the update |
| Number of characters of the banner | 1 Byte | |
| Banner | N Bytes | Message #x |
| DSA signature | X Bytes | Signature of the above data by means of the private key of the central server |

FIG. 10

| Field | Size | Comments |
|---|---|---|
| Version | 1 Byte | Version of the message protocol |
| PleexId | 4 Bytes | User ID |
| Year | 1 Byte | Year of the relevant period |
| Month | 1 Byte | Month of the relevant period |
| Users met | 4 Bytes | Number of other users met |
| Received profiles | 4 Bytes | Number of received profiles |
| Sent profiles | 4 Bytes | Number of sent profiles |
| Matches | 4 Bytes | Number of matches |
| Number of invitations | 4 Bytes | Number of invitations sent |
| Number of useful SMS | 4 Bytes | Number of useful SMS sent |
| Number of anonymous SMS | 4 Bytes | Number of anonymous SMS sent |
| Number of phones without the on-board software | 4 Bytes | Number of Bluetooth phones met not having the invention system running |
| Total loyalty points | 4 Bytes | Total number of loyalty points earned during the period |
| Historique des Pleexos gagnés | 4 Bytes | Number of loyalty points earned during previous periods but not transmitted to the server |

METHODS AND SYSTEMS FOR COMMUNITY-WIDE INFORMATION EXCHANGE VIA INDIVIDUAL COMMUNICATIONS TERMINALS

This is a non-provisional application claiming the benefit of International application number PCT/EP2007/062209 filed Nov. 12, 2007, U.S. Provisional Application No. 60/857,873 filed Nov. 10, 2006, U.S. Provisional Application No. 60/998,364 filed Oct. 9, 2007, and U.S. Provisional Application No. 60/998,312 filed Oct. 9, 2007.

The present invention generally relates to methods and systems designed to enlarge information exchange capabilities on communicating handset equipment such as cell phones or personal digital assistants, in particular for exchanges using short range wireless network technology with nearby equipment.

STATE OF THE ART

Nowadays it is common practice to exchange various types of information or files between communications terminals or handsets, including communicating PDAs or computers, through proximity wireless connections such as those provided under the Bluetooth® protocol.

However, such communication of information results from decisions by users from a terminal to another, and this communication medium, by its essential proximity nature, cannot be used for community-wide communications where users remote from each other may wish to exchange information according to their wishes, needs, etc., in other words their 'profiles'.

Of course, other types of community-wide communications, or peer-to-peer type, are easily obtained through networks of remote, permanently connected computers (basically the Internet), but are not operable in a network of terminals that are basically connected to each other except for deliberate point-to-point voice or data communications and that generally need manual acceptance for proximity communications such as via Bluetooth.

SUMMARY OF THE INVENTION

It is therefore an object of the invention to provide a community-wide information exchange scheme that does not have to rely on a fixed or semi-fixed network of equipment and that can take benefit of the short-range communications capabilities of modern terminals such as handsets or communicating PDAs and of the fact that by nature, such terminals are in movement and have connections opportunities with other users that are varied and numerous.

Accordingly, the present invention provides according to a first aspect a method for detecting matching profiles in an environment of wireless terminals each having a short range communications capability, comprising the steps of:
  generating profiles respectively belonging to a plurality of users,
  storing said profiles in wireless terminals associated with said user,
  when a pair of terminals become in range with each other, automatically establishing a short range bidirectional communications channel therebetween,
  through this channel, transmitting the profiles stored in each terminal to the other terminal,
  performing a matching test between said received profiles and other profiles previously stored in the terminal, and
  when a matching between profiles is determined by a terminal, providing profile matching information so that the users to which said profiles belong can be put in connection with each other.

Preferred but non limiting aspects of this method are as follows:
  said profiles are generated according to a profile model structure, and the method comprises the step of transcripting profiles into a compact size.
  said matching test comprises a comparison between profile attributes contained in each profile.
  said comparison is a weighed matching test of attributes.
  the method comprises selectively deleting transmitted profiles in response to their age.
  the method comprises selectively deleting transmitted profiles in response to the number of times they have been transmitted from a terminal to another.
  the method comprises transmitting said profile matching information to a server for notification to at least one of the users to which the matching profiles belong.
  the method further comprises the step of counting predetermined events involved in the performance of said method, for loyalty accounting purposes.
  each terminal has a text message transmission functionality, and the method further comprises the step of automatically inserting into a text message before transmission a text advertisement, and/or the step of automatically displaying in association with a text message during editing and before transmission a text advertisement, and/or the step of automatically displaying in association with a received text message a text advertisement.
  said predetermined events include text advertisement events.

According to another aspect, the present invention provides a method for automatically connecting two devices having short-range communications capability through a communications protocol in which search phases alternate with listen phases according to search and listen phase timings which are essentially the same for all devices, comprising the step of adding to at least one of said phase timings in at least one of the devices a random time shift, whereby synchronous search and listen phases in both devices are avoided.

Preferred aspects are as follows:
  said communications protocol is the Bluetooth protocol.
  the random time shift is based on a random number derived from a device address used by the communications protocol.

Another aspect of the present invention is a method for instant messaging between terminals, comprising the following steps:
  providing geographically distributed base stations having short-range communications capabilities, each base station being connected to the other base stations through fixed network communications,
  providing a plurality of communications terminals having short-range communications capabilities,
  automatically connecting a first terminal with a first base station according to the method as defined above,
  automatically connecting a second terminal with a second base station according to the method as defined above,
  using instant messaging protocol layers over the short range communications and the fixed network communications.

The present invention provides according to another aspect a wireless communications terminal having a short range communications capability, comprising:
- a memory for storing profiles respectively belonging to a plurality of users,
- a communications circuit for automatically establishing a short range bidirectional communications channel with another terminal when both terminals become in range with each other,
- a circuit for transmitting the profiles stored in the terminal to said other terminal, and for receiving and storing the profiles stored in said other terminal,
- a processor for performing a matching test between said received profiles and the other profiles previously stored in the terminal, and for providing profile matching information when a matching between profiles is determined, said information allowing users to which said profiles belong can be put in connection with each other.

Preferred but non limiting aspects are as follows:
- the terminal further comprises a profile generator for generating profiles according to a profile model structure, and a processor for transcripting the generated profiles into a compact size.
- the matching test comprises a comparison between profile attributes contained in each profile.
- said comparison is a weighed matching test of attributes.
- the terminal further comprises a circuit for selectively deleting transmitted profiles in response to their age.
- the terminal further comprises a circuit selectively deleting transmitted profiles in response to the number of times they have been transmitted from a terminal to another.
- the terminal comprises a circuit for transmitting said profile matching information to a server for notification to at least one of the users to which the matching profiles belong.
- the terminal further comprises a counter for counting predetermined events involved in the performance of said method, for loyalty accounting purposes.
- the terminal has a text message transmission functionality, and further comprises a circuit for automatically inserting into a text message before transmission a text advertisement, and/or a circuit for automatically displaying in association with a text message during editing and before transmission a text advertisement, and/or a circuit for automatically displaying in association with a received text message a text advertisement.
- said predetermined events include text advertisement events.

According to another aspect of the invention, a terminal is provided having short-range communications capability through a communications protocol in which search phases alternate with listen phases according to search and listen phase timings which are essentially the same for devices having such a capability, said terminal comprising a time shift circuit for adding to at least one of said phase timings a random time shift, whereby synchronous search and listen phases in different devices are avoided.

Preferably:
- said communications protocol is the Bluetooth protocol.
- the random time shift is based on a random number derived from an address of the terminal used by the communications protocol.

The present invention also provides a server for profile matching notification, comprising:
- a reception circuit for receiving profile matching information generated in a terminal as defined above,
- a user identification circuit for deriving from the received information an identifier of at least one user to which belongs a profile involved in said matching, and
- a transmission circuit for transmitting a profile matching notification to the user thus identified.

The present invention further provides a system for detecting matching profiles in an environment of wireless terminals each having a short range communications capability, and for notifying users of profile matching, comprising the combination of a plurality of terminals as defined above and of at least one server as defined in the previous paragraph.

The system preferably further comprising a plurality of geographically distributed base stations having short-range communications capabilities, each base station being connected to the other base stations and to said at least one server through fixed network communications.

BRIEF DESCRIPTION OF THE DRAWINGS

A detailed description of preferred embodiments of the present invention will now be made, with reference to the appended drawings, in which:

FIG. 2 shows a timing diagram illustrating the how a communication between terminals is made, FIG. 3 illustrates the structure of a packet header used in a L2CAP protocol in accordance with the present invention, FIG. 4 illustrates the structure of a message header used in the present invention, FIGS. 5A and 5B shows an example of a profile model used in the present invention, FIG. 6 illustrates the binary format of a profile model after a size-reducing transcription, FIG. 7 shows the structure of a profile for profile storage and transmission, FIG. 8 diagrammatically illustrates a profile exchange protocol according to the present invention, FIG. 10 is an example of the contents structure of a SMS message for loyalty points transmission to a server.

DETAILED DESCRIPTION OF A PREFERRED EMBODIMENT

I. Foreword

I.1. The Underlying Technology

Figure 1A:
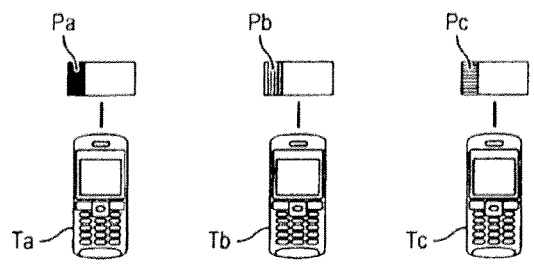
FIGS. 1A to 1C illustrate the propagation of profiles between terminals according to the present invention.

So that the system may function on most terminals or handsets, the invention is in this example implemented on the J2ME (Java 2, Micro Edition) platform from Sun Technologies, based on a java virtual machine. Thus it is possible to execute the same code on different platforms without having to worry about the specificities of the various operating systems, given that most handsets, even mid range ones, today have a java virtual machine.

Moreover, in order to avoid the limits of the J2ME platform for graphics, the system is also based on the J2MEPolish platform available from the Enough Software Company, Bremen, Germany. With this platform, the designer has available a whole set of rich graphics components with homogeneous look and feel on various handsets.

Moreover, the development of applications for mobile handsets using Java is made problematic through implementation errors of the Java standard in the JSR (Java Specification Request), which are interfaces toward the system on which the application is running (in particular access to network resources, to wireless proximity network peripherals such as Bluetooth, to the file system, etc.).

The conditional compilation of the J2MEPolish tool makes it possible, here again, to insert if necessary code specific to the handset for which the application is compiled and thus get around certain problems specific to it.

Moreover, the J2MEPolish tool being expandable, it is easy for a person skilled in the art to add the support of new handset models, adding their characteristics into its device characteristics data base.

Finally, the J2MEPolish tool contains the tools necessary for a simple management of the internationalization of programs written in this environment.

I.2. General Presentation of the Invention

The systems and methods of this invention, as shown in detail below, rely on the following new elements that may be considered separately or in combination. These elements are:
- the transitivity of data sets such as profiles, allowing such sets to spread from one communicating handset to another,
- managing the diffusion of contents subject to copyrights, such as musical contents,
- an improvement of the possibilities offered by the communication layers of these handsets,
- the cooperation of the handsets with dedicated base stations making it possible to improve the efficiency and the possibilities of the offered systems and methods.

II. The Various Functions

II.1. Peer-to-Peer Exchanges

Introduction

One feature of the systems and methods according to this invention is to allow users to exchange automatically a large variety of information such as personal profiles, files, etc. with the community of other users.

Each user (member) of the community thus has the possibility of defining a certain number of profiles representing him in different contexts (looking for a job, encounters, musical tastes, etc.). To these profiles may be attached one or several files (CV or resume, musical files in MP3 format for example, etc.), which will be exchanged at the same time as these profiles.

This collection of profiles constituted by the user form a sort of virtual multi-dimensional signature that defines in a unique way all of his contextual identities.

This signature will then be spread, like a virus, thanks to applications running in the communicating handsets used in the invention's systems and methods, which ensure a function of 'transitivity' and which will be described below.

Each member of the community thus plays the role of a relay for the other members that he crosses by carrying and diffusing their information (or a part of this information in the case where volume constraints—large files—exist, in which case they are replaced by meta-information describing their contents).

Figure 1B:
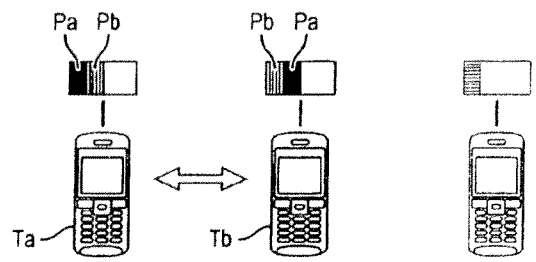
Figure 1C:
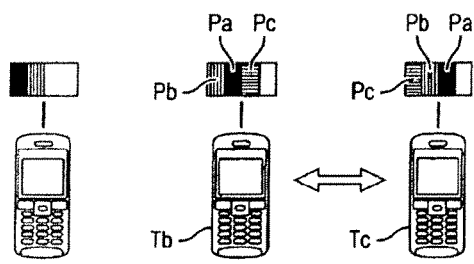

Initially referring to FIGS. 1A to 1C, the example of different users A, B, C is considered. Each of them has a communicating terminal or handset, respectively Ta, Tb and Tc, on which an on-board application of the invention system is installed and in which a certain number of profiles are initially memorized, respectively Pa, Pb and Pc.

In accordance with the basic principle of this function of the invention, when users A and B are geographically close enough to each other, so that their handsets Ta and Tb can communicate by wireless proximity network (typically Bluetooth), a communication between both these handsets is automatically established, and the profiles Pa, Pb that they store are exchanged through this communication path (FIG. 1B).

If user B later becomes located in the vicinity of user C, a communication is established in the same way between handsets Tb and Tc and handset Tb transfers to handset Tc the profiles that it has stored, namely not only his own profiles Pb but also the ones (Pa) received from user A. The situation is now that user C has never directly met user A, but putting them into contact with each other if some matching between their profiles is found now becomes possible.

One can therefore understand the multiplication effect of system the present invention, which operates by exponential diffusion and results in the considerable increase in the chances of finding a matching profile.

This exponential diffusion leading to a corresponding increase in the volume of transmitted information, the on-board programs, as we shall see, have specific functions for eliminating profiles from the handset memories in order to avoid their saturation.

(Nevertheless, the storage memory of the handsets being greater and greater today, this constraint should be considerably lightened in the upcoming years.)

A first function of the on-board application consists in detecting an error situation resulting from a saturation of the storage space, and then eliminating profiles received in order of age (each profile containing for this a parameter of time and date at which it was created by its issuer). The oldest profiles are eliminated successively until this storage space is again large enough for containing the received profiles.

A second function can consist in automatically filtering the received profiles with respect to their distance, materialized by the number of times a profile was transmitted from one handset to another. The theory of <<small worlds>> (see in particular http://en.wikipedia.org/wiki/Small_world_phenomenon) specifies that, after a certain degree of distance, the information becomes less pertinent.

Thus, by transmitting, with each profile, its level of depth in the network, that is the number of times it has been transmitted, it is possible to implement filters based simply on this number and thus to eliminate profiles whose degree of distance is too great.

This second function, combined with the elimination of old profiles when the storage space is saturated, makes it possible to limit profile diffusion efficiently.

II.1.1. Communication Modes

The exchanges may be made, transparently for the application, through various communication media. For this, the system preferably relies on a data exchange abstraction layer, which makes it possible to go easily from one communication medium to another (Bluetooth, GPRS/UMTS/HSDPA, WiFi, etc.) with respect to available, existing or future technologies.

In this embodiment, the system and method relies on the Bluetooth communication medium, which involves proximity exchanges (typically, up to 10 m with current circuits). This notion of proximity is a great asset for a certain number of uses (encounters, professional events, etc.), the protagonists having the possibility to meet in person quite easily once pairing between both handsets has taken place.

At the same time, by ensuring the transitivity function of the profiles, in accordance with this aspect of the invention, the limits linked to this proximity requirement (i.e. the low probability of crossing someone whose handset is equipped with the on-board software and having a compatible profile) are avoided.

The Bluetooth communication used relies preferably on the L2CAP layer, which is more complex to manipulate than RFCOMM when it functions in packet mode and not in stream-oriented mode (by analogy, RFCOMM is similar to a TCP layer, while L2CAP is similar to UDP). The use of this layer makes it possible, however, to have a greater degree of flexibility and to become freed from a certain number of RFCOMM limitations, in particular in terms of performances.

This has moreover made it possible to develop a specific data transfer protocol in order to optimize use of the pass band to its full advantage and to make up for certain problems inherent in the variable quality of Bluetooth L2CAP links (packet loss, etc.). This communication layer offers, to upper layers, a stream-oriented transfer mode, which makes its use simpler.

This aspect of the invention, as well as others, are based moreover on a method defining even another aspect of the invention, in most cases, with the possibility of improving Bluetooth detection times and thus decreasing the time necessary for both handsets to pair up and exchange profiles.

Indeed, certain Bluetooth stacks do not make it possible for one handset to be discovered by another when it itself is searching for other peripherals. Then, if both handsets are searching at the same time, they will never see each other. This method is based on the introduction of parameters in the discovery process, making it possible to become freed from these limitations.

The first of these parameters makes it possible to interrupt the search process (which normally takes 10.5 seconds in all) at the end of a given time. It has been noted that neighboring peripherals are generally discovered in the first seconds of this method and thus it is often useless to wait until it reaches its conclusion.

The second parameter introduces a random waiting or shift time (the random number generator being for example initialized with the handset's Bluetooth address) between two search periods in order to improve the chances that the handset will be visible by others.

This second modification only enters into action when the handset on which the on-board application is being executed needs it. This second condition can be determined at run time by accessing the device's system properties.

This makes it possible to gain precious seconds in the handsets' mutual discovery process.

FIG. 2 depicts the discovery and wait process described above on the nearby handsets.

This figure helps understanding that both handsets can be desynchronized and that a time window is created during which handset Ta can discover handset Tb (hatched area in FIG. 2).

II.1.2. Communication Protocols

The invention relies here on the well established principles of protocol <<layers>> in order to allow the system and the method to be adapted easily to different low level protocols.

In this case, two layers were defined:

i) a layer relying on the L2CAP protocol, whose mission is to manage traffic optimization as well as the specificities linked to Bluetooth (packet loss, etc.). This layer defines a header for each packet defining a sequence number of the packet, its size as well as the options making it possible to define its type (data packet or even acknowledge) and to define if other data follows: it includes a packet retransmission mechanism (taking up for example certain TCP principles), making it possible to ensure that the opposite side has correctly received the data. This also makes flow control possible and thus avoids packet losses cause by overflow of the receiver's reception buffers (whose size varies from one Bluetooth to another).

The header defined here is shown in FIG. 3.

The option field groups a bit mask which is checked to see if this concerns a data packet or an acknowledge, if other packets follow or if it is the last one.

The transaction identifier is used to connect the packet to its original message (by thus making it possible to become freed from the Bluetooth protocol limitations that do not guarantee the order in which the packets arrive).

This layer can be replaced, transparently for the upper layers, by another relying on a different data transfer protocol (GPRS for example).

ii) a generic message layer, making it possible to generate messages of all kinds automatically. These may contain data and attached files (principle of email and attachments). The transmission/reception layer of these messages is designed so that the type of message it carries does not have to be known, which makes it flexible and extendable.

The messages must simply comply with an interface.

This layer automatically creates a binary representation of the message by adding a header describing its characteristics (typically, its type, size, attachments). This information is then sent to the lower layer for transmission.

The header of a message is shown in FIG. 4. The elements in italics in this figure are optional elements. They are only present when the corresponding bit is set in the options field. This makes it possible to optimize use of the bandwidth by sending only that which is useful.

For obvious reasons of saving memory, the message management layer makes it possible to stream the attachments to messages by listing them and by writing them directly into the handset's mass storage (by using the layer for access to the file system such as will be described below), rather than by loading them completely into the memory during their transmission, this technique makes it possible to manage random-sized attachments and to become freed from the handsets' RAM limits.

II.2. The Profiles or Signatures

Each profile has a certain number of elements that are designed to be compared to each other, typically between a personal profile memorized in a handset and other profiles received by this same handset.

Preferably, no personal user information is transmitted with a profile, only a single user identifier, here called <<PlexID>>, being included. It is assigned to each user during recording and it is this alone that allows a central server, described below, to be able to enter into contact with a user, thus guaranteeing the anonymity of each person.

In order to ensure an extensibility of the system by adding new profiles upon demand, these profiles may be preferably described in the form of a tagged structure such as XML, this structure having the advantage of completely separating the attributes' textual representation from their semantic meaning. This makes it possible, in particular, to compare profiles written in different languages easily.

In order to be able to propose the invention's system in a white label, a partner identifier should be integrated into each profile model in order, for example, to exchange and use, in a specific version of the on-board application, only the types of profiles intended for it.

A version number should also be integrated into the profile data structures, allowing the on-board application to manage any changes between the various versions of the profiles and to compare only what is comparable.

The system, in accordance with the invention, can also have an importation function, for example via the Web or the Wap, for new types of profiles by foreseeing mechanisms making it possible to carry out these operations and designing the data structures allowing for this importation function: version management, profile model identifier, single identifier of their source (for example one of a network's partners).

In order to optimize processing the profiles in XML format, it is preferable not to consider their models as such while processing comparisons between profiles with the on-board application, but to pre-process them in order to validate their format on the one hand and on the other hand to convert the heavy (in size, in processing time and in memory) XML structure into a very compact binary format reducing greatly the necessary processing and storage resources inside the handset.

In the same way, a profile (which is nothing more than an instance of the model mentioned above) is represented in a compact binary format separating the semantics and the attributes. A profile (as long as it has no attachment) then only represents a few tens of bytes (typically about fifty). This thus makes it possible to store a large number of profiles on current handsets as well as to transfer them quickly from one participating handset to another.

II.2.1. The Profile Model

An example of a <<Business>> type profile model is shown in FIG. 5.

It shows the various attributes of this profile which contribute to model definition.

First of all, the <<Typical Profile>> attribute contains a single identifier of the <<id>> type profile, a version number and a name.

Then a succession of attributes of this model may be found. Each attribute has a single identifier in this <<id>> model, a label, a type that makes it possible to choose the type of graphic elements to be displayed during profile presentation, and the specifying attributes if this attribute is compulsory, if it is used by the profile comparison algorithm and the weight of this attribute during comparisons.

This information is used by a profile parser that will transcribe it into binary format which is much more compact than the starting XML structure.

The binary format of a profile model after such a transcription is shown in FIG. 6.

The properties of the attribute are encoded in a bit mask giving its type (for example, <<Drop Down>> text, password) and making it possible to specify if the attribute is compulsory, if it is used by the pairing algorithm, etc.

It can thus be understood that a simple profile (in particular without weight function for comparing profiles) occupies a volume of 11 bytes, plus the bytes necessary for storing its label. Finally, it would be enough to add at least 2 bytes per attribute plus the bytes necessary for storing its label.

A simple profile with 4 simple attributes can thus be contained in a storage space of less than 30 bytes.

II.2.2. The Profile

A profile is nothing more than an instance of a type of profile.

The storage and transmission structure is shown in FIG. 7.

The invention's system makes it possible to take into account the various languages in which the user interface is available, and in particular to compare a profile of a type written in English with another profile of the same type but written in French, thanks to mapping of the attribute's id to its display label, which makes it possible to compare both profiles independently of the language.

II.2.3 Profile Exchange

When two handsets are paired, the first one that discovered the other one connects itself, playing the role of client while the other plays the role of server.

In this logic, we again come up against the fact that the Bluetooth handset to which we wish to connect risks to fall back into search mode. It is then highly possible that it cannot accept the connection while it is in this state.

In accordance with the invention and as explained above, this constraint is taken into account by making sure that the client handset tries several times to establish the connection with a random waiting time between each attempt determined with respect to a random number generator programmed into the handset and initialized for example with the handset's Bluetooth address. This makes it possible to desynchronize the discovery and standby periods of both Bluetooth handsets and to avoid situations making pairing impossible.

If now both handsets discover each other at the same time, each one will try to connect to the other one and become a client.

When establishing connections with a view to profile transfers, a software layer is put in charge of checking that a connection with the handset towards which another handset tries to connect itself does not already exist. If such a connection exists, the on-board programs decide to keep the connection belonging to one of the two handsets according to a given common rule and, for example, to keep the connection with the handset whose digital value of the Bluetooth address is the greatest (the system for doing this converts the Bluetooth addresses, which are a series of bytes, into whole numbers that are compared). This makes it possible to settle the conflict without both handsets having to exchange information, each one knowing by definition the address of the other one when it tries to connect to it.

Figures 8, 9:
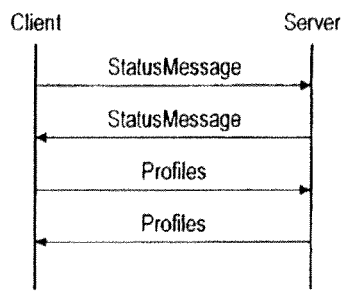
FIG. 9 shows an exemplary format of an advertisement updating message according to the present invention.

Once the connection is established, and referring to FIG. 8, the profile exchange protocol is:

i) the client handset takes in hand and sends a status message containing its <<PleexID>> identifier and the status of the user (for example <<busy>>, <<available>>, <<do not disturb>>, etc.).

ii) the server handset then answers by a status message.

iii) then each one sends to the other the profiles destined for it.

In order to minimize the volume of information to be transmitted at each pairing between equipped handsets, each handset keeps in memory, for each profile, the list of identifiers (<<PleexID>>) of the recipients to which it has sent this profile. This avoids transmitting the same profile several times to the same handset.

At each profile modification, and thus at each new version of the profile, this list is erased and this new version will thus be transmitted again to each handset encountered that participates in the system.

When it receives new profiles, the handset will ensure, for each of them, that it only has the most recent one (version called upper one). Indeed, it is possible that an older profile is still being transmitted by the handsets of the system while a more recent version of the profile has just been put into circulation.

In the same way, it may occur that a handset receives a same profile (in a same version) from two different sources. In this case, only one of these profiles is kept.

Each profile received by a handset is then compared to the profile base of the same type contained in the concerned handset.

In some cases, it may occur that an entering profile corresponds to an older version of the system and cannot be read by the on-board application in order to compare it with other profiles, either because its type is unknown or because its structure is obsolete. In this case, the profile is not compared with preexisting profiles memorized locally.

Profile comparison uses, for example, a weighted calculation of the number of common elements, which gives a degree of compatibility. This degree of compatibility is compared to a threshold value that may be defined by the user that put the compared profile with preexisting profiles.

In the case where a degree of compatibility greater than or equal to this threshold value is obtained, the system is capable of using means for informing the emitters of both profiles, allowing them to enter into contact with each other.

As will be detailed below, this coupling can be done in a first step using anonymous SMS type messages, via a system server or even through an instant message via the Bluetooth connection in the case where the handsets of both users are in communication via this channel.

This instant message service relies preferably on the communication layers described above. It can thus exist independently from the various available communication media.

II.3. Anonymous SMS Messages and the Central Server

As described above, when a handset receives profiles, it does not know the identity of their owner and thus cannot directly contact his handset.

In accordance with the invention, the means making it possible to couple two users having close profiles are put into one server capable of carrying out this coupling without revealing the identity of either user involved in this relation, the server reacting to SMS type messages emitted by the handsets having detected such close profiles.

This server of the system can be a dedicated server that is interconnected with the various cell phone operators through a specialized service provider.

This server is capable of receiving from handsets, having identified close profiles according to the comparison method described above, SMS messages emitted by them and containing the PleexID identifiers for the <<owners>> of the two profiles.

The server is then capable of finding the cell phone number (or any other communication identifier, e-mail address or other, . . . ) thanks to the PleexID identifier of the receiver in order to send him an SMS message, without revealing the identity of the other user at this stage.

An anonymous dialogue between the two users may then be established through the server.

In order to receive SMS messages directly inside the application defined on a handset by the on-board application, two possibilities offered by the handsets' operating systems currently exist on the market:
  either sending an SMS towards a particular port of the handset, which is done by manipulating the UDH—User Data Header—of the SMS message, port on which the on-board application listens.
  or the automatic start of the on-board application during reception of an SMS.

The first approach allows the application to manage automatically the information coded in the SMS and to present it to the user in a message management interface integrated into the on-board application.

The second approach makes it possible to ensure that the messages will be received, even if the on-board application has not been started. Please note that this function is offered by the normative platform MIDP2.0 (Mobile Information Device Profile).

II.4. <<Useful>> SMS Messages

The system of this invention has another function, offering the user the possibility of sending regular SMS messages directly from the on-board application and thus winning loyalty points. Advantageously, an advertising message is automatically joined using the system at each exiting SMS message (see details below).

In order to make it easier to use this system, the on-board application is advantageously designed to allow the user to use his own address book memorized in this handset. This is made possible thanks to the option for personal digital assistants known under the name JSR-75 in the J2ME environment, an option that manages access to the PIM (Personal Information Management) part of the handset and that gives access to the address book, to the personal organizer, etc.

II.5. Instant Messaging Via Bluetooth

When the handsets of both users are close to each other, it is possible, in accordance with the invention, to establish an instant messaging session (typically text messaging) by relying on the Bluetooth communication layer.

Two neighboring users can thus communicate by instant messaging in a completely free way since they use neither a data network nor SMS type paying messaging.

Here again, each instant messaging exchange via Bluetooth can cause winning loyalty points.

This function is based on the creation of an L2CAP service independent from the service used for transferring profiles, which allows both services to function at the same time (instant messages may be exchanged while the profiles are being transferred).

For this, the generic communication layers described in paragraph XX are exploited here once again. More specifically, creating specific messages is enough to describe the instant messaging, namely:
  an open session request message.
  a reply exchange message.
  a close session message.

This function can be enriched, using known attachment mechanisms, by a file transfer function directly integrated into the instant messaging session.

Like for profile transfer, establishing a Bluetooth connection for instant messaging can cope with the fact that the second handset with which the first handset wishes to connect can be in <<search>> mode. This problem is advantageously solved in the same way as previously, with successive connection attempts separated by random time intervals.

II.6. Advertising

As indicated above, the on-board application has a program designed to include automatically an advertising message in each SMS message, generating loyalty points for the sender. Preferably, this message is presented to the sender while writing the message, which makes it possible to ensure a double visualization of the message, at the departure point as well as at the arrival point.

In accordance with this aspect of this invention, the system can be used according to any advertising management model. For example, in order to be able to take advantage of this advertising system as soon as the system is started up, a simple advertising management model may consist in having in memory a certain number of advertising messages and in choosing one at random each time a message drafting window is displayed.

Preferably, displaying an advertising message is generated for each of the following events:
  sending an anonymous SMS message: the sender sees the message displayed when he writes his SMS, and the receiver potentially sees another message generated in his own handset when he reads the SMS. To gain on the pass band, the advertising message is in this case not sent with the anonymous SMS.

sending an SMS generating loyalty points: the sender then sees the advertising message while writing his SMS; the advertising message is then included in the text of the SMS so that the receiver, whether he has the system of this invention or not, sees it displayed when the SMS is received.

In order to take into account the arrival of new announcers, it is preferable to foresee an updating system for advertising messages memorized at the level of the on-board application. This may be done, for example, using SMS messages sent by the server to on-board applications participating in the system.

Advantageously, in order to avoid any intrusion and the diffusion of unwanted messages, these messages can be protected by a digital signature system, for example on the DSA coding base with a public/private key pair, in the following way:

in association with the on-board application, a copy of the original key contained in a message distribution center is memorized in the handset;

each message containing a new advertising message designed to be used by the system is signed with the private key of the message distribution center message;

at reception of the message, the on-board application can thus check the integrity and authenticity of the information received.

Messages containing different advertisements can be sent to handsets belonging to various categories of users with respect to well defined criteria (targeted advertising).

An example of the format of an advertisement updating message is shown in FIG. 9.

The last two fields are repeated for each <<advertising message>> contained in the SMS.

Given that the J2ME environment does not currently propose cryptography modules, a dedicated module is added to the on-board application, making it possible to use DSA algorithms (creation of a key pair, signature management, etc.).

According to a variant embodiment of the system with installation of Bluetooth base stations (see detailed description below), automatic updating of the advertising messages may be provided at each connection of a handset with such a base station. The advantage of such a solution is that it makes it possible to diffuse the doubly targeted advertisement, namely by the user profile and by the geographic location of the base station).

II.7. Loyalty Points and their Management

II.7.1 Description

The loyalty point management system, in accordance with an aspect of the invention, makes it possible to develop client loyalty by giving them the possibility of participating, in a first step, in quiz games every month, then in a second step, in using these points for example in virtual shops linked to the invention system in order to buy extensions for the on-board application (skins, avatars, etc.).

In a basic embodiment, the various actions making it possible to win loyalty points are:
sending profiles (X points per profile sent);
receiving profiles (X points per profile received);
receiving a profile compatible with one of the user's profiles (X points per compatible profile);
instant messaging with another user;
sending an anonymous SMS;
sending a useful SMS;
sending an invitation to join the user community (by SMS or by Bluetooth channel);
using the on-board application (X points per hour of using the application).

As a variant, the possibility of winning additional points may be foreseen when an invited user effectively joins the users' community (sponsoring).

II.7.2. Transmission and Protection

In an embodiment, loyalty points are stored in the handset by the on-board application. These points can be transmitted to the central server upon proposal by the application at the start of each month and after acceptance by the user. This transmission can be made for example by SMS or by a dedicated protocol during communication with a Bluetooth base station to the system (see description below) or even by resorting to the handset's data channel.

Of course, other solutions are possible: automatic monthly, weekly, daily posting, posting in real time when new points are won, etc.

In the case of transmitting points by SMS message, an example of the message format is shown in FIG. 10.

Such a format makes it possible not only to collect the total points gained by a user but also to get a fine vision of his various actions, in particular for statistical treatment.

The last field of the message makes it possible not to loose the points accumulated during previous periods when the user does not wish to have his points sent back to the server.

It is important that the system ensures that the loyalty points are effectively sent by the application and belong to the user who has sent the message.

In a basic implementation, a simplified protection mechanism may be provided in which:
each time points are saved, the information is stored in two different places of the handset and a checksum of this information is also kept.
at start up of the on-board application, it executes a checking module that ensures that both these pieces of information as well as the checksum agree.

As a variant, a procedure guaranteeing a greater resistance to fraud may be foreseen, including recourse to a digital signature for example according to the DSA coding mentioned above, in the following way:
when the on-board application is started up for the first time on a handset, it generates a set of public/private keys that will be used later to authenticate it with the central server;
the public key is sent to the central server at the same time as the user recorder information and this key is paired with the user's PleexID identifier; the private key is kept by the handset;
messages containing information of points won during the month are signed using the private key;
the central server can thus check the authenticity and the integrity of the message and credit the user's point account with no risk of fraud.

II.8. Virality

In order to promote expansion of this invention, it preferably integrates functions allowing each person owning a handset to invite his friends, relations, etc. to join the community of users.

This may be done for example using the following methods:
invitation by Bluetooth: the system includes a function relying on the OBEX (OBject EXchange) protocol making it possible to send a message (in WML or VCARD format) to neighboring handsets, it being specified that with such a protocol a specific application is needed on the target handset and that the simple presence of Bluetooth and the ObexObjectPush profile is enough). The receiver is informed a message has been received and can, through his WAP navigator, have direct access to the downloading site.

invitation by SMS: Every invited person receives a message by SMS containing an URL address giving his direct access to the downloading site.

However such functions may be tricky to use because of the heterogeneity of handset makes and models. Indeed, some models do not know how to interpret the message or wait for a format that is different from the sender's.

To solve this disadvantage, such an exchange could profitably be made with a remote identification of the type (make and model) of the target handset in order to determine the formats of the messages recognized by the target handset and to transmit the message according to one of these formats.

Such a remote identification can rely on the data that a handset conventionally has available to it at discovery of another handset via Bluetooth, namely its Bluetooth address, whose first bytes identify the manufacturer of the Bluetooth peripheral and thus generally the manufacturer of the handset, then upon establishing a signature of the Bluetooth services available on the handset and comparing this signature to all the signatures contained in a signature data base, thus identifying the model with a correct reliability.

II.9. Instant Messaging

The on-board application can include moreover a function making it possible to propose to users access to the various existing instant messaging networks (MSN, GoogleTalk, Yahoo messenger, ICQ, etc.—all registered makes) from this on-board application.

This function advantageously relies on two aspects of the invention previously described, namely:

the generic communication protocol making it possible to add new types of messages very simply; more specifically, a simple extension of the messages used for instant messaging via Bluetooth makes it possible to have access to this function.

the creation of a gateway making it possible to go from the environment of this invention to these networks; this gateway relies advantageously on the Jabber protocol (registered make) which is an open protocol and for which a large number of copyright free implementations exists. Once transcribed into the Jabber language, the messages generated by the on-board application of the system can then be routed by the Jabber platform towards the various instant messaging networks through the many Jabber gateways→XXX existing.

In order to remain flexible and upgradeable, this gateway between the universe of this invention and other environments is made preferably not inside the on-board applications but at the level of the central server hosting this gateway service. This allows us to limit the complexity of the on-board application and to make updates without forcing the users to install new versions of the on-board application.

In a basic embodiment, the instant messaging central server is accessible through the data network to which the handset belongs (typically GPRS, UMTS, HSDPA), thus allowing the user to have access to the service at all times.

As a variant, it is possible to install an instant messaging gateway in various Bluetooth base stations dedicated to the system (see description in the next paragraph) in order to offer the possibility of having access to these networks free of charge and to relocate gateway processing.

II.10. Bluetooth Base Stations

The system of this invention can preferably benefit from the development of dedicated Bluetooth relay base stations to handsets belonging to the system.

From the hardware standpoint, such a base station includes at least a central processing unit (processor, RAM and flash memory) and input/output interfaces linked to a plurality of Bluetooth circuits and to the central server(s) of the system for example via TCP/IP.

Using an appropriate protocol during pairing, such a base station is detected by a handset belonging to the system as a supplier of functions and special services.

This is possible by a simple extension of the communication messages while relying on the specific protocols described above.

These functions and services are in particular the following:

relays for the profiles: the base station plays the role of a <<super user>> by storing the profiles contained in the handsets connected to it; this will increase the density of the network created by the dedicated base stations and thus increase the chances of matching between profiles;

gateway towards the existing instant messaging networks (see above);

substitute for SMS messaging: at any time, the system can know, through links between base stations and the central server(s), that the user handset is connected to such a base station; when two users wish to enter into contact (for example by anonymous SMS when a matching between profiles is detected), the message is then routed directly between the base stations, thus making the users' information mechanism entirely free of charge;

relay for advertising: the base stations constitute a powerful tool for doubly targeted advertising; indeed, each base station is by definition in a specific geographic place, which makes it possible to present location-based contextual advertising; in addition, the profile of the user whose handset is connected to the base station is known, making it possible to refine even more the selection of the advertising message or messages destined for him.

In accordance with an optional aspect, the owner of any personal computer may be offered the possibility of making this computer a member of the network supporting the system of this invention by downloading and installing a specific <<base station>> application.

Preferably, this application relies on virtual machine languages (Java, Python, etc.) as well as on an access layer of the Bluetooth stack of the operating system, making its specificities independent (for example, the avetanaBluetooth JSR82 solution available from Avenata GmbH, Germany, available on the most common personal computer operating systems).

This makes it possible to increase even further the density of the installed base stations and to create a dense meshing in order to make access to this invention's system easier.

II.11 Access to the Handset's Files System

For certain functions, the on-board application must have access to the handset's mass storage (in its internal storage space or of course on the removable memory pack).

In the J2ME environment, this is possible thanks to the JSR-75 layer. However, a certain number of disparities can appear, depending on the handset models, in the management of certain parameters and in the behavior of this layer. In order to isolate application of these specificities, an abstraction layer is preferably associated with the on-board application, making functions available to the former giving access to the files and encapsulating management of the specificities.

In the same way, a management layer for the handset directories in which writing is allowed can be preferably provided, these directories being defined differently from one handset to another.

II.12. File Exchange

In accordance with another optional characteristic of the invention, the idea of transferring files linked to a profile can easily be extended, allowing the system to offer an exchange service for all types of files with in particular an advanced support of musical files in MP3 format.

More specifically, in the case where the on-board application has a decoding module for information contained in the ID3Vxx tag of such files, it becomes possible to extract automatically the information relative to this file (such as the artist, album, type, song title, etc.) contained in the tag.

This allows the application to build, in each handset, a data base characterizing the musical files that the user accepts to share with the rest of the community. This information is then exchanged with the handsets met according to the invention's system and compared to the search criteria of each of them, that can be seen as specific profiles. Compatible musical files are then transferred between both handsets.

Because of the data volumes at stake, it may now be difficult to apply the profile transitivity mechanism described above to complete musical files. The transitivity is then limited to file catalogues.

Then, once the musical profiles are detected as being matching, the musical files can be transferred between both concerned users by data communication network (thus by becoming freed from the proximity condition between both handsets).

In this regard, in order to respect contents whose copy is not free, a mechanism making it possible to limit the number of transfers of a given musical file may be foreseen. This number of transfers can be limited in two dimensions: on the one hand a user can transfer this file to N users and on the other hand this file can only be transferred to a depth P within the network. The total number of transfers is then N×P.

In this case, a protected file contains preferably a certain number of attributes, stored in the ID3Vxx tags, signed by an electronic signature describing its copy origins. The system of this invention is then able to make the diffusion constraints of each musical file be respected.

III. Architecture of the Application

As shown by the preceding description, this invention is advantageously based on well proven software architectural principles.

For each large logical function such as communication, access to the file system, MP3 file management, etc., the system incorporates an access interface that encapsulates all the functions and complexity.

These various modules or Frameworks are grouped in a <<Toolkit>>.

This architecture makes it possible to test each function individually and to bring the modifications necessary for its good functioning on the various models of the handsets without having an impact on the rest of the application.

These services can also be reused as such in other environments. For example, the communication protocol described above can be reused without modification in a PC or in a base station supporting the Java environment. This allows us to minimize development efforts and integration problems.

Figure 11:
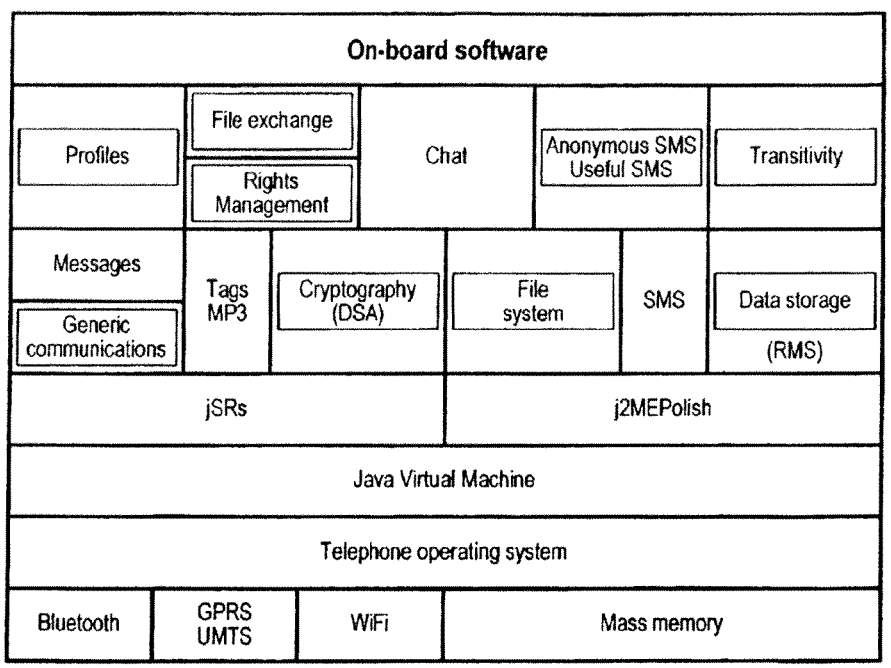
FIG. 11 is a summary view of the architecture of on-board software used in the systems and methods of the present invention.

The diagram in FIG. 11 is a summary view of the on-board software architecture.

Of course, this invention is not limited to the realization forms described above and represented in the drawings, but a person skilled in the art will know how to bring new variants and modifications, in particular with the evolution of information technologies and telecommunications, without leaving its framework.

In addition, the present disclosure covers any individual feature or function as described above, as well as any novel combination of at least two of such features or functions.

The invention claimed is:

1. A method for detecting matching profiles in an environment of wireless terminals each having a short communications capability, comprising the steps of:
   generating profiles respectively belonging to a plurality users,
   storing said profiles in wireless terminals associated with said user,
   when a pair of terminals become in range with other, automatically establishing a short range bidirectional communications channel therebetween,
   through this channel, transmitting the profiles stored in each terminal of said pair to the other terminal,
   performing a matching test between said received profiles and other profiles previously stored in the terminal, and
   when a matching between profiles is determined by a terminal, providing profile matching information so that the users to which said profiles belong to be put in connection with each other, and
   selectively deleting transmitted profiles in response to at least one of the number of terminals associated with different users that received said profiles and a depth representing a propagation distance of said profiles from their associated terminals.

2. A method according to claim 1, wherein said profiles are generated according to a profile model structure, and comprising the step of transcripting profiles into a compact size.

3. A method according to claim 1, wherein said matching test comprises a comparison between profile attributes contained in each profile.

4. A method according to claim 3, wherein said comparison is a weighed matching test of attributes.

5. A method according to claim 1, further comprising selectively deleting transmitted profiles in response to their age.

6. A method according to claim 1, comprising transmitting said profile matching information to a server for notification to at least one of the users to which the matching profiles belong.

7. A method according to claim 1, further comprising the step of counting predetermined events involved in the performance of said method, for loyalty accounting purposes.

8. A method according to claim 1, wherein each terminal has a text message transmission functionality, further comprising the step of automatically inserting into a text message before transmission a text advertisement.

9. A method according to claim 1, wherein each terminal has a text message transmission functionality, further comprising the step of automatically displaying in association with a text message during editing and before transmission a text advertisement.

10. A method according to claim 1, wherein each terminal has a text message transmission functionality, further comprising the step of automatically displaying in association with a received text message a text advertisement.

11. A method according to claim 7, wherein said predetermined events include text advertisement events.

12. A wireless communications terminal having a short range communications capability, comprising:
   a memory for storing profiles respectively belonging to a plurality of users, a communications circuit for automatically establishing a short range bidirectional communications channel with another terminal when both terminals become in range with each other,
a circuit for transmitting the profiles stored in the terminal to said other terminal, and for receiving and storing the profiles stored in said other terminal,
a processor for performing a matching test between said received profiles and the other profiles previously stored in the terminal, and for providing profile matching information when a matching between profiles is determined, said information allowing users to which said profiles belong to can be put in connection with each other, and
a circuit selectively deleting transmitted profiles in response to at least one of the number of terminals associated with different users that received said profiles and a depth representing a propagation distance of said profiles from their associated terminals.

13. A terminal according to claim 12, further comprising a profile generator for generating profiles according to a profile model structure, and a processor for transcripting the generated profiles into a compact size.

14. A terminal according to claim 12, wherein the matching test comprises a comparison between profile attributes contained in each profile.

15. A terminal according to claim 14, wherein said comparison is a weighed matching test of attributes.

16. A terminal according to claim 12, further comprising a circuit for selectively deleting transmitted profiles in response to their age.

17. A terminal according to claim 12, comprising a circuit for transmitting said profile matching information to a server for notification to at least one of the users to which the matching profiles belong.

18. A terminal according to claim 12, further comprising a counter for counting predetermined events involved in the performance of said method, for loyalty accounting purposes.

19. A terminal according to claim 12, having a text message transmission functionality, further comprising a circuit for automatically inserting into a text message before transmission a text advertisement.

20. A terminal according to claim 12, having a text message transmission functionality, further a circuit for automatically displaying in association with a text message during editing and before transmission a text advertisement.

21. A terminal according to claim 12, having a text message transmission functionality, further a circuit for automatically displaying in association with a received text message a text advertisement.

22. A server for profile matching notification, comprising:
a reception circuit for receiving profile matching information generated in a terminal according to claim 12,
a user identification circuit for deriving from the received information an identifier of at least one user to which belongs a profile involved in said matching, and
a transmission circuit for transmitting a profile matching notification to the user thus identified.

23. A system for detecting matching profiles in an environment of wireless terminals each having a short range communications capability, and for notifying users of profile matching, comprising the combination of a plurality of terminals according to claim 12 and of at least one server for profile matching notification, said server including
a reception circuit for receiving profile matching information generated in one of said plurality of terminals, a user identification circuit for deriving front the received information an identifier of at least one user to which belongs a profile involved in said matching, and
a transmission circuit for transmitting a profile matching notification to the user thus identified.

24. A system according to claim 23, further comprising a plurality of geographically distributed base stations having short-range communications capabilities, each base station being connected to the other base stations and to said at least one server through fixed network communications.

* * * * *

UNITED STATES PATENT AND TRADEMARK OFFICE
CERTIFICATE OF CORRECTION

PATENT NO. : 8,892,037 B2
APPLICATION NO. : 12/514433
DATED : November 18, 2014
INVENTOR(S) : Jean-Francois Auriffeille et al.

Page 1 of 1

It is certified that error appears in the above-identified patent and that said Letters Patent is hereby corrected as shown below:

In the Claims,

Column 19, Claim 12, line 13, please delete "belong to" and insert --belong--.

Signed and Sealed this
Twenty-eighth Day of April, 2015

Michelle K. Lee
*Director of the United States Patent and Trademark Office*